Jan. 14, 1941.   H. G. WILLIAMS   2,228,495
COMPOSITE PISTON RING
Filed Aug. 25, 1937
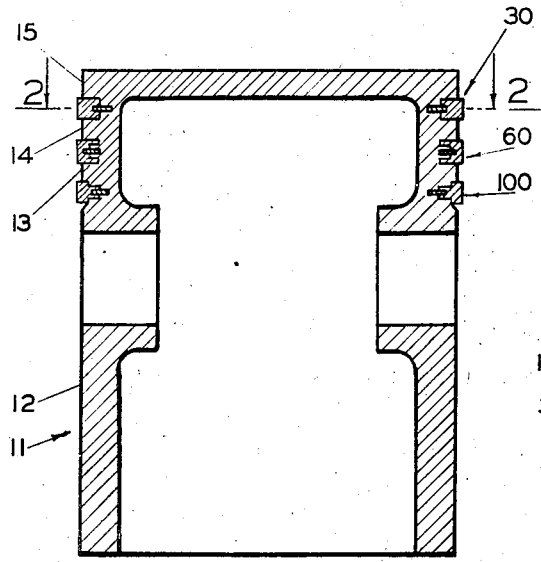
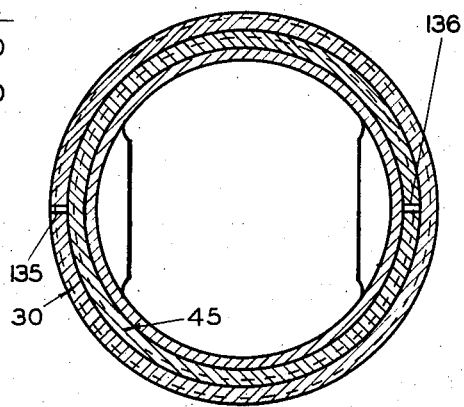
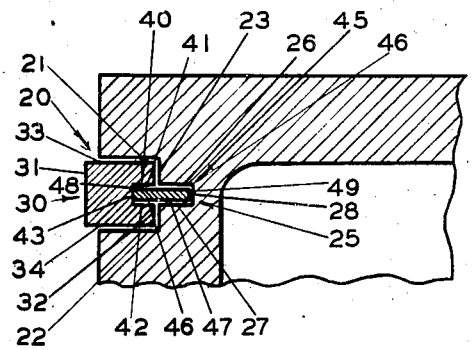
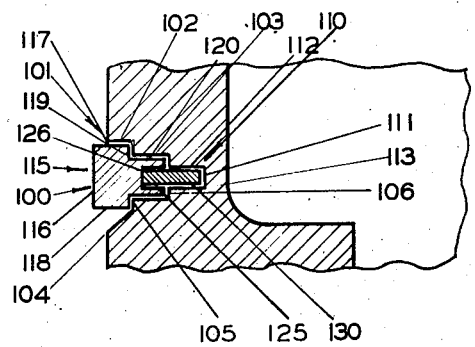
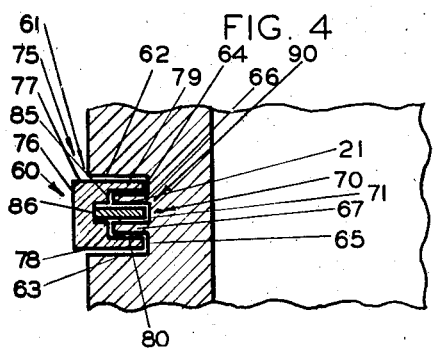
INVENTOR
HARRISON G. WILLIAMS
BY Hazard & Miller
ATTORNEYS Patented Jan. 14, 1941

2,228,495

UNITED STATES PATENT OFFICE 2,228,495

COMPOSITE PISTON RING

Harrison Graham Williams, South Gate, Calif.

Application August 25, 1937, Serial No. 160,797

5 Claims. (Cl. 309—29)

I designate my invention as a composite piston ring in that each ring is composed of a main or outer ring and an inner thin combination expanding and sealing ring. In the operation of internal combustion engines the rings perform the function of preventing a blow past by the piston of the compressed combustion gases in the cylinder head above the piston and also of the products of combustion on the explosion or power stroke. The rings also restrict or prevent the upflow of oil used to lubricate the cylinder wall into the head of the cylinder. It is known that in cylinders of true cylindrical cross section, that the rings form an effective sealing means against the cylinder walls to restrict or prevent the blow past of the fuel or combustion products or the upflow of the oil however in practically every engine after usage for some time, there develops the trouble of the blow past of the raw and exploded fuel and also of the oil. It has been found that this generally takes place around the back of the ring or rings. The rings fit in annular grooves in the piston and in the working of the piston lengthwise of the cylinder in its reciprocating action and also due to the very slight sidewise or oscillating action of the piston, wear develops on the upper and lower faces of the grooves, this giving space for the blow past and the upflow of oil. Moreover in a good many types of rings after a slight wear is developed, the ring can tilt slightly which develops an action of scraping or cutting the cylinder walls as well as providing the space for the blow past at the back of the ring.

A main object and feature of my invention is therefore to restrict or prevent the flow of fuel or other products of combustion and the oil past the back or inside of the ring in the groove of the piston provided to accommodate the piston ring. Therefore in conjunction with the main or outer ring, I provide a narrow combination expanding or sealing ring. This ring is located in an annular groove provided in the cylinder only large enough to accommodate this inner ring. Such inner ring in expanding outwardly presses the main ring out against the cylinder wall and thus has its expander function.

In addition the inner ring restrains the main or outer ring from longitudinal movement in the piston, that is, in its particular groove and also a tilting action, hence restricts the wear on the upper and lower faces of each main groove. In addition the sealing ring as above mentioned fits in its own groove in the piston and hence develops a tortuous path on the inside surface of both grooves around which the fuel or products of combustion or the oil would have to pass. Manifestly this construction increases the sealing characteristics of the composite ring. The inner ring also has its outer portion fit in a groove cut on the inside of the main or outer ring, hence the inner ring operating as an expander bears snugly against the base of this latter groove thereby effectively preventing leakage through the groove in the outer ring.

My invention may be constructed in a number of different forms. For instance the groove in the piston may be a simple type having parallel upper and lower faces and a cylindrical base or bottom, the main ring therefore being rectangular in cross section except for the groove extending outwardly from its inside surface. The wall of the piston in this construction is provided with a secondary narrow groove centrally positioned between the top and bottom faces of the main groove in which the secondary expanding or sealing ring fits. In all forms of construction it is desirable to have the secondary groove in the piston for the sealing ring of greater depth than the groove in the main ring to receive such sealing ring.

In another construction the main groove may be provided with a pair of annular projecting ribs with a secondary groove formed therebetween. In this case the main ring has an annular recess to fit around these ribs and also has a groove extending outwardly from its inner surface to accommodate the sealing ring which fits in the secondary groove between the ribs. In another form of my construction the main groove in the piston is made with a first or a shallow section and inside this a deep section, thus providing staggered upper and lower faces for this main groove. The secondary groove is then cut into the piston extending below the base of the deepest part of the main groove. The main ring is therefore of a shouldered type with the widest part fitting in the shallow part of the main groove and a narrower inner extension portion fitting in the deeper portion of the groove. In this case also the secondary groove for the expander and sealing ring extends into the wall of the piston and also into into the inner part of the main ring.

My invention is illustrated in connection with the accompanying drawing, in which:

Fig. 1 is a vertical section of a piston illustrating the three types of composite rings fitted therein to give the most efficient action in preventing the blow past of the fuel or combustion products or the upflow of oil.

Fig. 2 is a section on the line 2—2 of Fig. 1 through the upper ring.

Fig. 3 is an enlarged partial section of Fig. 1 showing the upper ring.

Fig. 4 is an enlarged section of Fig. 1 showing the second ring from the top.

Fig. 5 is an enlarged section of Fig. 1 showing the third or lowermost ring.

Dealing with the characteristics of the piston 11, this may be made substantially in accordance with the standard practice in which the skirt portion 12 is what is termed full diameter, the first land 13 is of lesser diameter with the least clearance, the second land 14 has greater clearance and the upper land 15 has the greater clearance. These differences in diameter of the lands provide for substantially equal expansion due to the graduated temperature decreasing from the piston head towards the skirt.

The main characteristics of the ring grooves and the composite ring are as follows having reference first to the construction detailed in Fig. 3. The upper groove 20 in the piston has upper and lower faces 21 and 22 and a back or base 23 of the groove. The base is cylindrical and the faces 21 and 22 are at right angles to the axis of the piston. Extending inwardly from the base 23 there is the secondary groove 25. This also has upper and lower faces 26 and 27 and a base 28. This groove is quite narrow, in fact the illustration in the drawing exaggerates the size of the groove 25. Such groove should be centrally positioned between the upper and lower faces 21 and 22 of the main groove 20.

The characteristics of the main or outer ring 30 is that this has a cylindrical outer surface 31, also a cylindrical inner surface 32, these being concentric and upper and lower surfaces 33 and 34. Cut into the ring from the back surface 32 there is a ring groove 40. This also has upper and lower surfaces 41 and 42 with an outer base 43, this base being cylindrical and concentric with the outer surface 31 and the inner surface 32. This groove in the main ring should be the same width, that is, considered longitudinally of the piston as the groove 25 in the piston.

The sealing ring designated by the assembly numeral 45 has plane upper and lower surfaces 46 and 47, a cylindrical outer surface 48 and also a cylindrical inner surface 49. Thus the surfaces 43 and 49 are concentric. The ring is quite thin. In the drawing greater clearances are shown than in actual practice and the projection of the main ring from the piston is also exaggerated. However when the piston is fitted in a cylinder the natural resiliency of the main ring brings the outer surface 31 into close contact with the cylinder. There is also the usual close fit of the top and bottom plane surfaces of the main ring with the upper and lower faces 22 and 34 of the main groove. The inside surface of the ring is however slightly sprung away from the base of the main groove. The secondary ring 45 is also resilient and expands outwardly, its outside cylindrical surface having a pressure contact with the base 43 of the groove 40 in the outer ring. The inside surface of the secondary ring is thus slightly spaced from the base of the secondary groove 25 but this ring has a snug fit in the groove of the main ring and also in the secondary groove of the piston.

It will therefore be seen by this construction that the secondary ring operates as an expander but is quite different from the usual expander fitted back of the ordinary piston rings in that my secondary ring is quite narrow and has plane upper and lower surfaces exactly transverse to the axis of the piston. It has no dish or concavity in its upper or lower surfaces. There is therefore quite an extensive surface area of the secondary ring in contact with the upper and lower surfaces of the groove in the main ring and there is a greater surface contact of the upper and lower surfaces of the secondary ring in the upper and lower surfaces of the secondary groove in the piston. As above mentioned the secondary groove in the piston is deeper than the groove in the main ring. This composite ring therefore does not prevent a slight working in and out of the main ring in its own groove but an expanding thrust is maintained tending to hold the main ring out into true cylindrical contact with the cylinder wall. Also the inner or secondary ring prevents a tilt of the main ring, the whole construction reducing the wear on the upper faces 21 and 22 of the main groove and also on the upper and lower faces of the main ring, thereby reducing the space through which the fuel or oil may pass the ring. Manifestly the secondary ring gives an increased sealing effect as it blocks the passage between the inside of the main ring and the base of the main groove. The only substantial clearance developed is that between the inside surface of the secondary ring and the base of the secondary groove but on account of the snug fit and the little chance of movement of the inner or secondary ring, there is but little chance of wear of the upper and lower faces of the secondary groove in the piston or the upper and lower faces of the secondary ring, thus developing an effective secondary sealing action.

The characteristics of the second ring assembly (note Fig. 4) designated by the numeral 60 includes the wall of the piston being formed with a main groove 61 having upper and lower faces 62 and 63 transverse to the axis of the piston. The base of the groove has two base sections 64 and 65 separated by upper and lower ribs 66 and 67 between which is formed the secondary groove 70. The contiguous faces of the ribs thus form the upper and lower faces of this secondary groove and it has its own base 71 preferably in alignment with the base sections 64 and 65 of the main groove. It will be understood that all of the transverse faces of the main and secondary grooves are parallel and the secondary groove is preferably spaced in a mid position as to the main groove.

The main ring designated by the assembly numeral 75 has an outer cylindrical face 76, upper and lower parallel faces 77 and 78 with projecting tongues 79 and 80 fitting in the main groove between the ribs 66 and 67. The main ring has a primary groove 85 to accommodate the ribs and a secondary groove 86 registering in alignment with the secondary grooves 71 in the wall of the piston. The secondary combination expander and sealing ring 90 fits in the secondary groove 70 between the ribs 66 and 67 and in the secondary groove 86 of the main ring. In this illustration the clearances are shown greater than in actual practice. When set up in a piston manifestly the face 76 of the main ring contacts and conforms to the piston and there is a close clearance between the upper and lower faces of the main ring and the upper and lower faces 62 and 63 of the main groove. There is however a clearance on the inside of the projecting tongues 79 and 80 and the base portions 64 and 65 of the main grooves and also a clearance of the primary groove 85 in the main ring from the outer cylindrical edge of the ribs 66 and 67.

The secondary ring 90 is cylindrical on both its inside and outside edges and expands outwardly having a snug fit and contact against the primary ring in its secondary groove 86. The clearance of the faces of the secondary ring and the upper and lower faces of this secondary groove in the ring and the secondary groove between the ribs 66 and 67 is quite close. There is also a clearance between the inside face of the secondary ring and the base 71 of the secondary groove 70. It will therefore be seen that the secondary ring is operative on expanding outwardly to reenforce the outward pressure of the main ring. It prevents or restrains a tilting action of such main ring and affords a tortuous path for any blow past of consumed or unconsumed fuel in one direction or lubricating oil in the other direction. For instance for fuel or oil to pass the composite ring, it will be necessary for this to flow along the upper and lower faces 62 and 63 of the main groove around the projecting tongues 79 and 80, around the projecting ribs of the piston 66 and 67, along the surface of the expander and sealing ring 90, past the space back of this ring, as manifestly on account of this ring pressing outwardly tightly against the main ring, there will be no leakage or flow past the outer periphery of the secondary ring as it is seated in the secondary groove 86 in the main ring. It will therefore be seen that the ring shown in Fig. 4 is a very efficient ring in preventing blow past of unburned or exploded fuel or oil.

The third type of ring assembly designated by the numeral 100 and illustrated in detail in Fig. 5 has the characteristics of a main groove 101. This groove has a first shallow section 102 and a deeper section 103. In the illustration a bevel 104 is cut from the base 105 of the shallow section to the periphery of the piston. The base of the deep section is indicated at 106. The upper and lower faces of the shallow sections are transverse to the axis of the piston, the base of the grooves are cylindrical and concentric with the piston and the deep groove is centrally positioned relative to the shallow groove.

The secondary groove 110 is cut in the wall of the piston below the deep section in the main groove and is centrally positioned as to this main groove. It has a base 111 and upper and lower faces 112 and 113. The base is cylindrical and the upper and lower faces are transverse to the axis of the piston and thus parallel to the upper and lower faces of the main groove.

The main ring designated 115 has the characteristic of a cylindrical outside surface 116, transverse upper and lower faces 117 and 118 and cylindrical shoulders 119 with an annular rib 120 extending inwardly into the deep section of the groove. The shoulders conform to the base of the shallow section of the main groove. The ring has a groove 125 cut in the rib 120, this groove having the characteristics of a cylindrical base 126 and transverse upper and lower faces. The secondary ring used for sealing and designated 130 fits in the secondary groove 110 of the piston and the groove 125 in the main ring 115. As this ring expands outwardly when the main ring is fitted in the cylinder, there is a tight contact and seal between the outer periphery of the secondary ring and the base of the groove 125 of the main ring. It is to be understood that the clearance between the upper and lower faces of the main ring, both the outer part and the rib, are quite close to the staggered or shouldered upper and lower faces of the main groove, there being however a clearance between the inside cylindrical surfaces of the main ring and the base of the shallow and the deeper groove. The secondary ring also has a close clearance between the upper and lower faces of the secondary groove of the piston and the groove of the main ring but there is a clearance between the base of the secondary ring and the base of the secondary groove in the piston. The ring also functions as above mentioned, to expand the main ring outwardly, also preventing a tilting and forms with the main ring and the various grooves a tortuous path which must be followed by either a blow past of unexploded or exploded fuel and oil. It will be apparent that this path must follow the surfaces of the main groove which in effect is stopped at the portion between the shallow part and the deep part and any leakage must also follow around the surfaces of the secondary groove. The leak past between the secondary ring and the main ring is closed off by the tight contact. It will be seen that the construction and action of the ring of Fig. 5 is closely similar to that of the ring of Fig. 4, developing substantially as many right angle turns for any flow past due to leakage. In all of the types as above mentioned, the secondary ring is quite thin as to the measurement between its upper and lower faces and these faces are parallel and transverse to the axis of the ring. The secondary rings may be made of the same size and material to fit with any of the three types shown of main rings. Therefore in constructing an assembly of rings for the piston, the secondary rings would be the same and it is only necessary to modify the shape of the grooves in the piston and the construction of the main rings. It is to be understood that in all of the rings the joints are preferably a butt joint as indicated at 135, Fig. 2, for the butt end joint of the main ring and at 136 for the butt joint of the secondary expander or sealing ring. These joints are cut radial as to the center of their respective rings and no particular structure or endeavor is made to maintain the joints of the rings in staggered relation or offset one to the other.

Various changes may be made in the details of the construction without departing from the spirit or scope of the invention as defined by the appended claims.

I claim:

1. A composite piston ring having a single split main ring with a cylindrical periphery and upper and lower plane surfaces at right angles to the axis of the ring to fit in a piston groove between lands and having an inner cylindrical surface with a groove extending outwardly from the latter surface towards the periphery, said groove being characterized by plane upper and lower faces and a cylindrical base, a relatively narrow complementary groove in the bottom wall of said first groove and a thin secondary ring flat as to a transverse plane fitted in the complementary groove of the main ring, the secondary ring having plane upper and lower surfaces and said groove and secondary ring being positioned midway between the upper and lower surfaces of the main ring.

2. A composite piston ring including a single split main ring to fit in the piston groove between lands having a cylindrical periphery, parallel plane upper and lower faces at right angles to the axis of said ring, said ring having a single relatively wide groove extending from its inner surface towards the periphery and a relatively narrow secondary groove extending from the bottom wall of the first groove towards the periphery of the main ring, the secondary groove being positioned equi-distant between the upper and lower faces of the main ring and a thin secondary ring flat as to a transverse plane having plane upper and lower faces at right angles to the axis of the latter ring and having a cylindrical outer edge.

3. A piston and ring assembly comprising the combination of a piston having substantially rectangular peripheral grooves; partitions dividing the inner portion of said grooves into a plurality of parallel concentric channels; and a split ring mounted in each of said grooves having a concentric groove around the inner periphery thereof and a relatively narrow concentric groove in the bottom wall of said groove centrally of the width thereof, the first ring groove being positioned to inclose the channels of the piston groove and the narrow groove being in register with and complementary to one of the intermediate channels of the piston groove, and a secondary ring mounted in said complementary grooves.

4. In a piston and ring assembly the combination of a piston having rectangular peripheral grooves, circumferential partitions extending from the bottom walls of said grooves and dividing the same into a plurality of circumferential channels, a split ring mounted in each of said grooves having a concentric groove around the inner periphery thereof and a relatively narrow groove in the bottom wall of said last groove centrally of the width thereof, the first groove straddling said circumferential partitions and the narrow groove registering with and complementing one of the channels of the piston groove, and a second ring in said complementary grooves.

5. A composite piston ring including a single split main ring substantially rectangular in transverse section having a relatively wide groove around the inner periphery thereof and a relatively narrow groove around the bottom wall of said last groove centrally of the width thereof, and a relatively wide and thin split ring mounted in said last groove.

HARRISON GRAHAM WILLIAMS.